United States Patent [19]

Amada

[11] Patent Number: 5,091,905
[45] Date of Patent: Feb. 25, 1992

[54] HIGH-SPEED PACKET SWITCHING USING A SPACE DIVISION OPTICAL SWITCH

[75] Inventor: Eiichi Amada, Kodaira, Japan

[73] Assignee: Hitachi, Ltd., Tokyo, Japan

[21] Appl. No.: 616,811

[22] Filed: Nov. 16, 1990

Related U.S. Application Data

[63] Continuation of Ser. No. 323,970, Mar. 15, 1989, abandoned.

[30] Foreign Application Priority Data

Mar. 18, 1988 [JP] Japan .................................. 63-63242

[51] Int. Cl.⁵ .......................... H04Q 11/04; H04J 3/26
[52] U.S. Cl. .................................. 370/60; 370/94.1; 370/63; 359/135
[58] Field of Search .................... 370/58.1, 58.2, 58.3, 370/59, 60, 60.1, 61, 63, 64, 1, 4, 94.1; 455/600, 612

[56] References Cited

U.S. PATENT DOCUMENTS

| | | | |
|---|---|---|---|
| 4,397,016 | 8/1983 | Broussaud | 370/4 |
| 4,495,615 | 1/1985 | Wilcke | 370/58.1 |
| 4,516,238 | 5/1985 | Huang et al. | 370/60 |
| 4,603,416 | 7/1986 | Servel et al. | 370/60 |
| 4,608,682 | 8/1986 | Nagashima et al. | 370/4 |
| 4,701,907 | 10/1987 | Collins | 370/63 |
| 4,718,058 | 1/1988 | Van Vugt | 370/63 |
| 4,736,462 | 4/1988 | Joel, Jr. | 455/600 |
| 4,755,986 | 7/1988 | Hirata | 370/94 |
| 4,760,570 | 7/1988 | Acampora et al. | 370/60 |
| 4,821,258 | 4/1989 | Fraser | 370/60 |
| 4,823,340 | 4/1989 | Grassman et al. | 370/60 |
| 4,829,512 | 5/1989 | Nakai et al. | 370/16 |
| 4,831,616 | 5/1989 | Huber | 370/4 |
| 4,845,703 | 7/1989 | Suzuki | 370/1 |
| 4,854,702 | 7/1989 | Melindo | 370/1 |

FOREIGN PATENT DOCUMENTS

| | | | |
|---|---|---|---|
| 0282071 | 9/1988 | European Pat. Off. | 370/4 |
| 2400491 | 5/1975 | Fed. Rep. of Germany | |

OTHER PUBLICATIONS

Der Fernnelde-Ingenieur, pp. 2-32, Sep. 9, 1987.

Primary Examiner—Douglas W. Olms
Assistant Examiner—Alpus H. Hsu
Attorney, Agent, or Firm—Fay, Sharpe, Beall, Fagan, Minnich & McKee

[57] ABSTRACT

The packet switching apparatus comprises input buffers for respective input ports; a space division optical switch for transferring packets from the input buffers to a desired output port; and a controller for controlling the switching on the basis of the header information of the packets. The controller analyzes the header of the packets from each input port to determine outputtable packets so that these outputtable packets are outputted all at once after the connection of the switch has been controlled. By repeating this process, the packets are continuously switched.

55 Claims, 11 Drawing Sheets

HIGH-SPEED PACKET SWITCHING USING A SPACE DIVISION OPTICAL SWITCH

This application is a continuation of application Ser. No. 323,970, filed Mar. 15, 1989, now abandoned.

BACKGROUND OF THE INVENTION

The present invention relates to switching packets of fixed length at a high speed.

A variety of such packet switching systems are known. Recently, there has been increased interest in obtaining high speed through the use of simplified protocol. A major function of such a high-speed packet switching system is to switch the packets in accordance with their header information and among the plurality of input ports and plurality of output ports by packet-multiplexing at a high speed, for example, about 150 Mbps. An excellent aspect of such high-speed packet switching systems is that the switching is accomplished by means of hardware. Such a system is exemplified by Japanese Patent Laid-Open No. 59-135994 and U.S. Pat. No. 4,516,238.

Japanese Patent Laid-Open No. 59-135994 multiplexes packets from a plurality of input ports into a common packet buffer. The addresses that are written as a part of the packet information are transferred to the output ports to which the same packets are to be outputted. At the output port sides, the transferred addresses are stored in first-in/first-out buffers, from which buffers the addresses are sequentially read out and used to read out the packets to be outputted from the common packet buffer and then subjected to parallel to series conversions until they are outputted. In U.S. Pat. No. 4,516,238 two-input/two-output switches are basically used and arranged in multiple stages to realize the packet switching function. THe two-input/two-output basic switches use a portion or all the bits of the address information of a packet header to switch the packets in a self-controlled manner. The system is composed of a cascade connection of three networks, that is, a classification network, a trap networks and extension network. Each of these three kinds of network is realized by a multi-stage connection of the aforementioned two-input/two-output basic switches.

SUMMARY

The above mentioned prior art has a major problem with respect to the high capacity packet switching.

In Japanese Patent Laid Open No. 59-135994, the accessing speed of the common packet buffer is inversely proportional to the produce of the number of input ports and the transmission rate of each input port. Therefore, the switching capacity of the packet switching apparatus is limited by the speed of the memory used.

In U.S. Pat. No. 4,516,238, the high capacity is bottlenecked by the increase in the number of interconnections to provide the switching. This is because the number of wires for interconnecting the two-input/two-output basic switches is proportional to the square of $\log_2 N$, where N is the number of input/output ports. A special problem is the diffuculty in switching the packets in accordance with the priority and the packets of the broadcasting mode.

Therefore, an object of the present invention is to provide a packet switching easily extended to have a higher capacity.

Another object of the present invention is to provide packet switching to easily process the packets given the priority and the packets of the broadcasting mode.

The packet switching apparatus according to the present invention comprises: input buffers for respective input ports; a space-division optical switch for transferring packets from the input buffers to a desired output port; and a controller for controlling the switching on the basis of the header information of the packets. The controller analyzes the header of the packets from each input port to determine outputtable packets so that these outputtable packets are outputted all at once after the connection of the switch has been controlled. By repeating this process, the packets are continuously switched.

By providing separate packet buffers for respective separate input ports, according to the present invention, reduction in the switching capacity due to the speed of the buffer memory can be drastically improved. Moreover, the space-division switch is constructed as an optical switch, so that the speed of the switching from input to output ports can be increased to thereby reduce the number of wires. Since the switching of the packets is controlled by the concentrated controller, it is easy to make correspondence for the packets given the priority and the packets of the broadcasting mode.

BRIEF DESCRIPTION OF THE DRAWING

Further objects, features and advantages of the present invention will become more clear from the following detailed description of preferred embodiments, shown in the accompanying drawing, wherein.

DETAILED DESCRIPTION OF THE PREFERRED EMBODIMENTS

Figure 1:
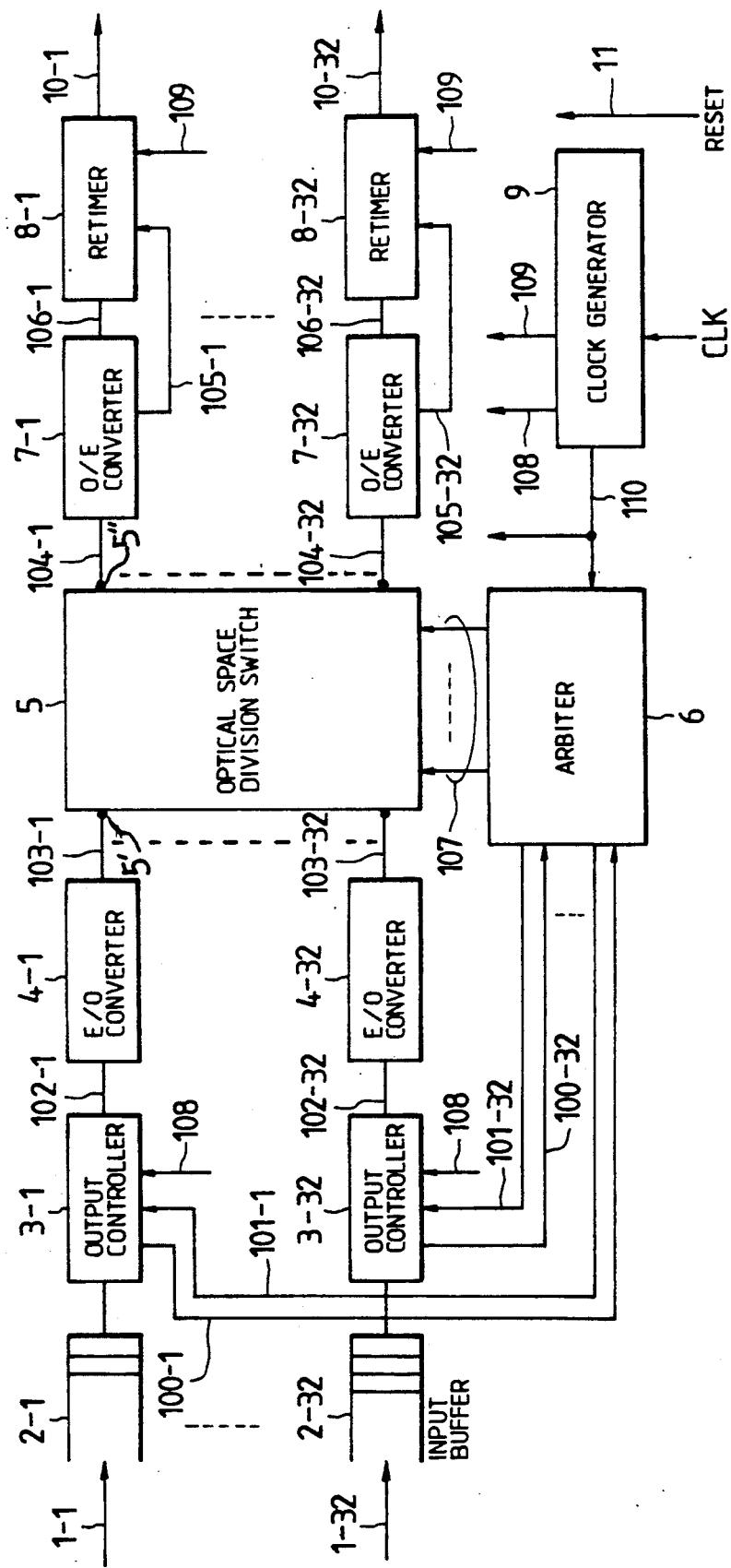
FIG. 1 is a schematic representation of a packet switching apparatus according to the present invention.

FIGS. 1-9 relate to the first embodiment of the present invention, whereas FIGS. 10-14 relate to a variation of the embodiment of the present invention. FIG. 15 shows a sequencing adaptable to both the structure of FIGS. 1–9 and 10–14.

For purposes of illustration, in the embodiment of FIGS. 1–9, the number of input ports will be assumed to be 32, and the number of outputs will be 32. The speed of each input/output port is 4.8 Gbps. For conciseness of illustration and description, only representative ones of duplicated structure will be illustrated and described. For example, in FIG. 1, only the structure physically associated with the first input port and the last input port (1-1 and 1-32, respectively) will be illustrated along with the structure common to all of them, with the understanding that 32 ports have only been set forth for the purposes of illustration. The structure associated with the other input ports, namely the 2nd through 31 input ports, although not shown, will be clear from the illustration and description.

In general, each input port 1 feeds packets to an input buffer 2, which feeds the packets to output controller 3, for passage through line 102 to an electrical to optical converter 4, so that the corresponding optical signal passing through line 103 is fed to an optical space division switch 5, under control of the arbiter 6. The optical space division switch 5 has switch inputs 5' and switch outputs 5''. The output of the space division optical switch 5 is fed as an optical signal through line 104 to an optical to electrical converter 7 to be outputted as an electrical signal in line 106, which electrical signal is retimed in retimer 8 to pass through output port 10, under control of clock 9 and reset signal 11. The clock 9, reset signal 11, arbiter 6 and optical spaced division switch 5 are shared by all of the input and output ports.

In operation, packets inputted to any one of the input ports 1-1 through 1-32 are temporarily stored in respective input buffers 2-1 through 2-32. The input buffers 2-1 through 2-32 are constructed as the well-known first-in/first-out type of buffer or as random access memories. Output control circuits 3-1 though 3-32 respectively determine the timing of the output of packets from the input buffers 2-1 through 2-32 to their respective lines 102-1 through 102-32 leading to respective electrical to optical converters 4-1 through 4-32 so that respective optical signals may pass through lines 103-1 through 103-32 to the commonly shared optical space division switch 5. The output control circuits 3-1 through 3-32 are controlled by a commonly shared arbiter 6. For this purpose, at least the header information of the packets stored in each of the input buffers 2-1 through 2-32 is fed from the corresponding output control circuit 3-1 through 3-32 through corresponding lines 100-1 through 100-32 to the arbiter. The arbiter makes a determination of whether or not the same output port is being requested for output by a plurality of packets, and then determines which of the input ports that are requesting the same output port is to be selected for outputting. The decisions of the arbiter are transferred from the arbiter 6 over lines 101-1 through 101-32 to respective output controller circuit 3-1 through 3-32, so that the output controller circuits control the connection of their input buffers to the optical space division switch 5. Further, the arbiter 6 controls the connections within optical space division switch 5 by control signals sent over lines 107.

The output controller circuits 3-1 through 3-32 that have been selected for outputting packets by the arbiter 6 will then extract such packets from their input buffers 2-1 through 2-32 and output them in a serial form by using clock timing signal 108 from clock 9. These extracted packets will undergo electrical to optical conversion within converters 4-1 through 4-32 so that only optical signals are sent to the optical space division switch 5.

The optical space division switch 5 is a cross-point type optical switch having 32 inputs and 32 outputs. Control of the on/off of each cross-point of the optical space division switch 5 is accomplished by the arbiter 6, which thereby determines the connection path from each input port to the output port designated by the header of the packets sent through such input port to the optical space division switch 5. Therefore, the optical signals representing the packets exiting the optical space division switch 5 at the chosen outputs 104-1 through 104-32, as determined by their header information, are then converted from optical to electrical signals by the O/E converter 7-1 through 7-32, and the electrical signals produced thereby are re-timed by re-timing circuits 8-1 through 8-32.

The packets arriving at the individual output lines 106-1 through 106-32 of the O/E converters 7-1 through 7-32 have delays that fluctuate in dependence upon the input port number and the connection path of the space division optical switch 5. Therefore, it is desirable to re-time these packets, for bit phase synchronization, before reaching the output ports 10-1 through 10-32. In the present invention, the clock 9 that is used for timing the outputting of the packets from the output controller circuits 3-1 through 3-2 is also used with signal 109 by wave length multiplexing techniques and clock signals in lines 105-1 to 105-32 through the re-timing circuits 8-1 through 8-32 for retiming the packets being provided to the output ports 10-1 through 10-32.

Figure 2:
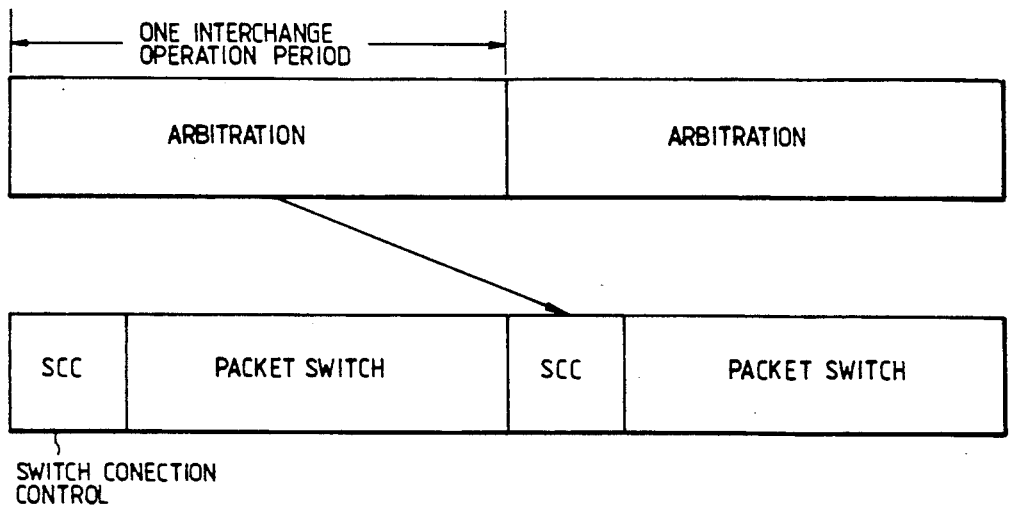
FIG. 2 is an illustration of the timing operation.

FIG. 2 shows the operation timings of the above-described structure of FIG. 1. In a pipe-line manner, there is the determination or arbitration of the outputtable packets by the arbiter 6, the switch connection control that sets the connection path of the space division optical switch 5 and the packet interchange within the space division optical switch 5. AS a result of the arbitration, the connection of the optical space division switch 5 is set to output all of the packets at once from the output control circuits 3. If the packet length is set at 34 bytes and the in-switch transmission speed of the optical space division switch is 4.8 Gbps, then 56.7 ns $(34 \times 8/ (4.8 \times 10^9)$ is required for the transfer of one packet. If the set connection time of the switch is 1 ns, one period for the interchange operation of one packet is 57.7 ns, so that $5.5 \times 10^8$ packets can be interchanged at the maximum.

Figure 3:
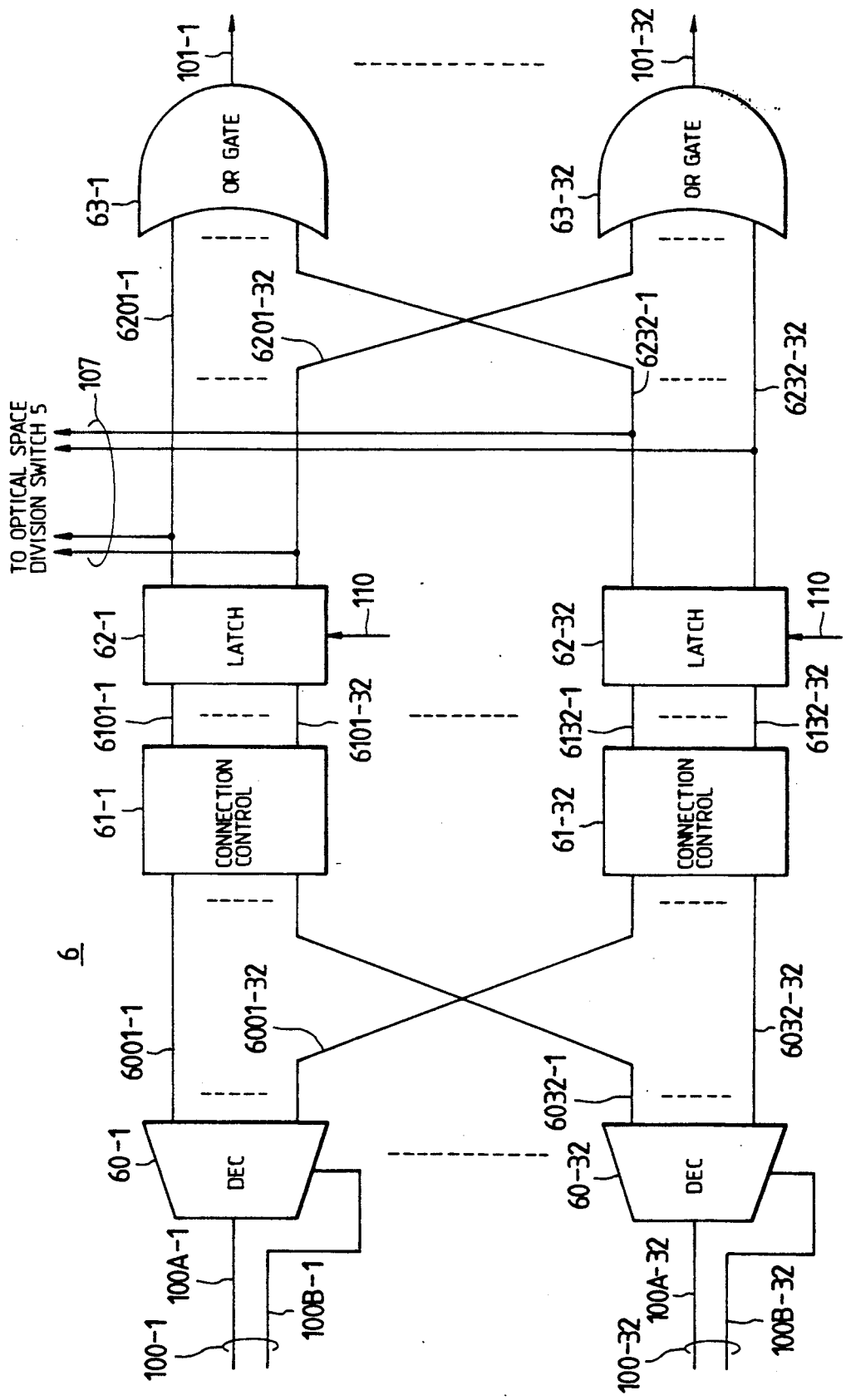
FIG. 3 shows the structure of the arbitor of FIG. 1 in more detail.

FIG. 3 shows the structure of the arbiter 6 of FIG. 1, in more detail. From the header of each packet, packet address information is sent, respectively, over lines 100-1 through 100-32 to the arbiter 6. This packet address information contains six bits, of which five bits can be decoded to indicate one of 32 output port numbers of the optical space division switch 5. The remaining bit or sixth bit indicates the existence of a packet output request. Decoders 60-1 through 60-32 respectively decode the five bits contained on their lines 100-1 through 100-32 and provide a decode bit single output port request signal, for each of the decoders, on one of the 32 decoder output lines, for example decoder output lines 6001-1 through 6,001-32 for decoder 60-1. By way of example, if line 100-1 contains a high for all of its six bits, that is "111111", the first five bits are decoded to indicate output port 32, so that output port request signal line 6001-32 goes high and output port request signal lines 6001-1 through 6001-31 remain low. The sixth bit being high, on line 100-1, indicates that there is an output request. In case any one or more of the input buffers 2-1 through 2-32 have no packet, the sixth bit for such buffers having no packet will be in the low or zero state when passed to the respective decoders 60-1 through 60-32 over lines 100-1through 100-32. When the sixth bit is zero, that is low or off, the sixth bit acts as an active high enable for the respective decoder, so that all of the output lines of the decoder are off. For example, if the sixth bit of line 100-32 from input buffer 2-32 is low, indicating no output packet request, then decoder 60-32 is not enabled and all of its output port request signal lines 6032-1 through 6032-32 remain low.

Connection controls 61-1 thourh 61-32 correspond respectively to the 32 output ports of the optical space division switch 5. For example, connection control 61-32 receives as inputs all of the lines 6001-32 through 6032-32 as inputs. Each one of these inputs having a one indicates that there is an output request for this specific output port. Therefore, if more than one of the lines leading to connection control 61-32, for example, contains a one, it means that a corresponding plurality of packets have simultaneously requested this output port, namely output port 32, and the connection control then determines which of the input buffers 2-1 through 2-32 that are simultaneously requesting its output port are to be connected. That is, for example, among the plurality of input buffers requesting output port 32, only one is chosen by the connection control according to a priority determination, that can be any suitable algorithm. According to this determination, only one of the plurality of highs on the input lines 6001-32 through 6032-32, for example, is passed to a corresponding one of the lines 6132-1 through 6132-32 leading to the latch 62-32 and the latch 62-32 is triggered by clock signal 110 to latch in this result and hold the result as an output on the selected one of the output lines of the latch 62-32, that is on one of the lines 6232-1 through 6232-32. Therefore, despite a plurality of hihgs on the lines 6001-32 through 6032-32 for the connection control 61-32, only one of the output lines 6232-1 through 6232-32 of the corresponding latch 62-32 will be high, to indicate which one of the input buffers, respectively, has been selected to pass its packet to the output port 32 of the optical space division switch 5.

These output lines from the latches 62-1 to 62-32 are respectively led to OR gates 63-1 through 63-32 as inputs for taking their logical sum. For example, if input buffer 2-1 has requested output to port 32 of the optical space division switch 5 and has been selected despite other input ports requesting output port 32, then only line 6232-1 of the lines 3232-1 through 3232-32, will be high leading to OR gate 63-1. Obviously, only one of the lines 6201-1 through 6232-1 will be high because there is only one high line from the decoder 60-1, and therefore the output of OR gate 63-1 is contained on line 101-1 and sent to the input port 2-1 to enable the output of the input buffer 2-1.

Therefore, as seen in FIg. 3, packet switching for fixed-length packets: controls the switches of switch 5 for transferring packets from input buffers 2-1 through 2-32 to designate output ports 10-1 through 10-32 by using the header information 100-1 of the packets in the input buffers, by decoding (at decoders 60-1 through 60-32, FIG. 3) the address of the packet of each input buffer i (i=1 to N: n=the number of input ports, which equals 32 in the example) to produce a packet output request signal A(i, j) (6001-1 through 6032-32 of FIG. 3) for a packet transfer to each output port j (j=1 to M: M=the number of said output ports, which equals 32 in the example);

determines the packets to be sent to individual output ports based on the request signals A (i, j) collected for the output ports and outputs a packet output enable signal B (i, j) (for allowing the packet to be sent from input port i to output port J); and takes a logical sum (OR gates 63-1 through 63-32 of FIG. 3) at eahc input port of output enable signals B (i, j) (6201-1 through 6232-32 of FIG. 3), to decide whether or not the packet output from input buffer i should be made.

All of the outputs from all of the latches 62-1 to 62-32 that is all of the signals on lines 6201-1 through 6232-32 (32 times 32 lines) are sent along lines 107 as switch control signals to the optical space division switch 5 to control the connections within the optical space division switch 5.

Figure 4:
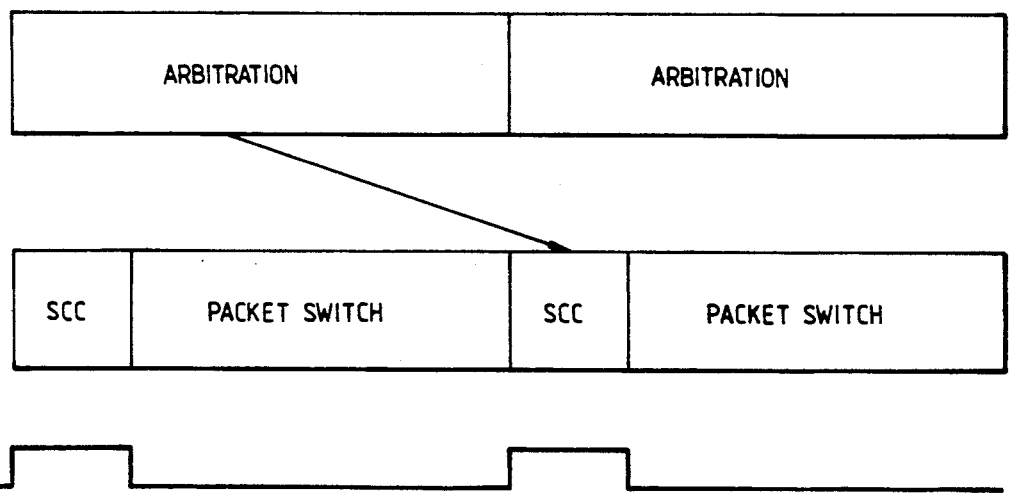
FIG. 4 shows the clock timing with respect to the latches shown in FIG. 3.

FIG. 4 shows the timing of the clock signal 110, from clock 9, which is fed to the latches 62-1 through 62-32, in At the end of the arbitration, the result of the arbitration is latched to control the connection of the switch and is returned to the output control circuits 102-1 through 102-32 to make preparations for outputting the packets from the input buffers and the optical space division switch 5.

Figure 5:
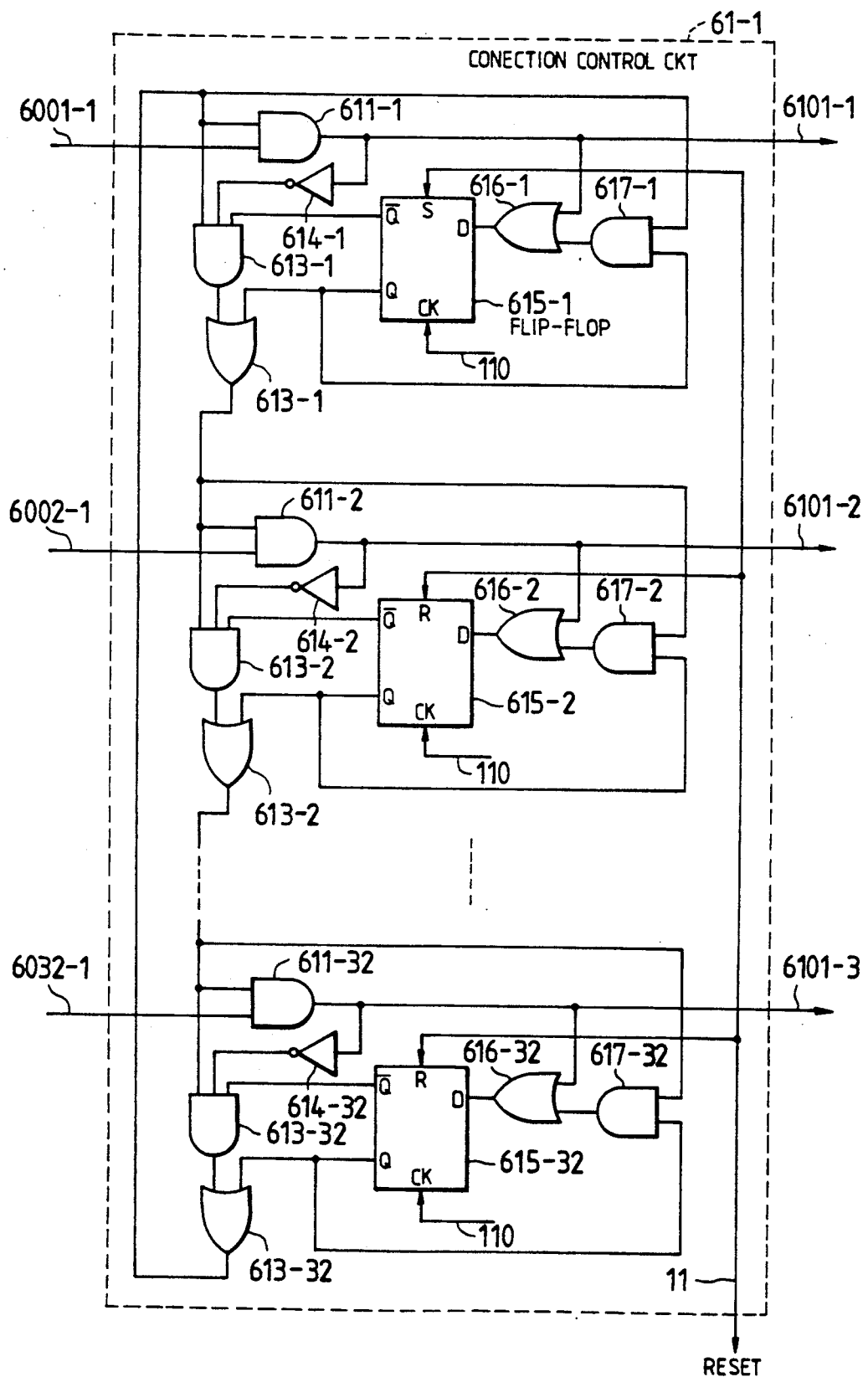
FIG. 5 illustrates in more detail the structure of the controller in FIG. 3.

FIG. 5 shows the circuit construction of the connection controller 61-1, which is identical to the circuit construction for the other connection controllers 61-2 through 61-32 of FIG. 3. In FIG. 5, there is duplicated circuit structure between each of the respective inputs and outputs of the connection control circuit, so that a representative one only will be described. D-type flip-flop 615-1 receives the clock signal 110 and corresponds to input buffer 1. The flip-flop 615-1 through 615-32 store informionat of the input buffer that has last outputted a packet to the respective output port, output port 1 in this case. For example, in a case input port 1 has last outputted a packet, only the flip-flop 615-1 has a high state and remaining flip-flops 615-2 and 615-32 have a low state. With reset, only the flip-flop 615-1 is turned on, with the remaining flip-flops 615-2 through 615-32 being turned off. Circuit 5 operates in the following manner:

(1) In case output port 1 of optical space division switch 5 is not requested for the packet output of any input buffer, all of the flip-flops 615-1 through 615-32 hold their previous states.

(2) In case the output port 1 is requested for the packet output by only one input buffer, the single flip-flop corresponding to such one input buffer is turned on. For example, if input buffer 2-2 is the only input buffer requesting output port 1, then only flip-flop 615-2 is turned on among the flip-flops in the connection control circuit 61-1.

(3) In case the output port 1 is requested for the packet output by a plurality of input buffers, an algorithm determines which one of the flip-flops is turned on. For example, the flip-flop is chosen that corresponds, numerically closest to the positioning of the input buffer number having last outputted the packet and having a larger number (which returns to one when it exceeds 32).

By way of example, in FIG. 5, assuming that only the flip-flop 615-1 is on, consider the case in which the output port 1 is requested for the packet output by the input buffer 2-2. Since the output of the flip-flop 615-1 is on or high, OR gate 613-1 is high, which combined with the high input on line 6002-1, provides a high on the output of AND gate 611-2 leading to OR-gate 616-2, so that the data input for flip-flop 615-2 is high and the flip-flop 615-2 is set by the next clock pulse 110. In the stage before the clock pulse is inputted, the flip-flop 615-2 and inverter 614-2 have low outputs so that the outputs of AND gate 612-2 is low and the output of OR gate 613-2 is also at the low level. As a result, the connection control circuit 61-1 has outputs 6101-1 and 6101-3 through 6101-32 having a low level. In case no packet output is requested from the input buffer 2-2: the output of the AND gate 611-2 is at the low level; the output of the inverter 614-2 is at the high level; the output of the AND gate 612-2 is at the high level; and the output of the OR gate 613-2 is at the high level. As a result, the input port that is first requested for the packet output as seen in the direction to increase the number from the input buffer 2-2 is selected. In case, on the other hand, no packet output is requested to the output port 1, the outputs of the OR gate 613-32 and the flip-flop 615-1 take a high level so that the flip-flop 615-1 holds the previous high state whereas the other flip-flops 615-2 through 615-32 are not varied and held in their previous states.

Figure 6:
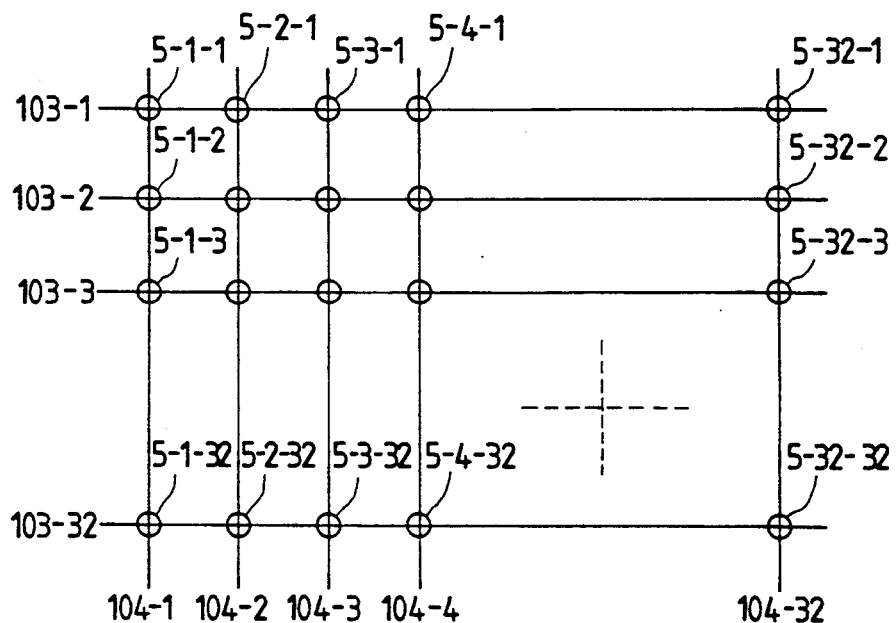
FIG. 6 shows the abstract structure of the space-division of optical switch.

FIG. 6 shows the abstract structure of the space-division optical switch. This switch is constructed to have 32 inputs 103-1 through 103-32 and 32 outputs 104-1 through 104-32, as well as switch elements 5-1-1 through 5-32-32, that is a total of 32×32 switch elements disposed at respective points of intersection of the inputs and outputs. By controlling the ON/OFF of the switch elements 5-1-1 through 5-32-32, a path can be set between arbitrary inputs and outputs. By turning on the switch 5-1-1 and turning off the switches 5-1-2 through 5-1-32, for example, the input 103-1 and the output 104-1 can be connected. A necessary connection is set by controlling the switch elements of FIG. 6 with the control information on the lines 107 from the arbiter 6 of FIG. 1 and 3. For example, the signals in lines 107-1-1 through 107-1-32 of FIG. 3 may indicate what input buffer packet is to be outputted to the output port 1, so that only the signal 103-1-K corresponding to an input buffer K for outputting the packet is on. As a result, the connection between the input buffer K and the output port 1 can be set by controlling the input-/output switch elements 5-1-1 through 5-1-32 with the signals on lines 107-1-1 through 107-1-32.

Figure 7:
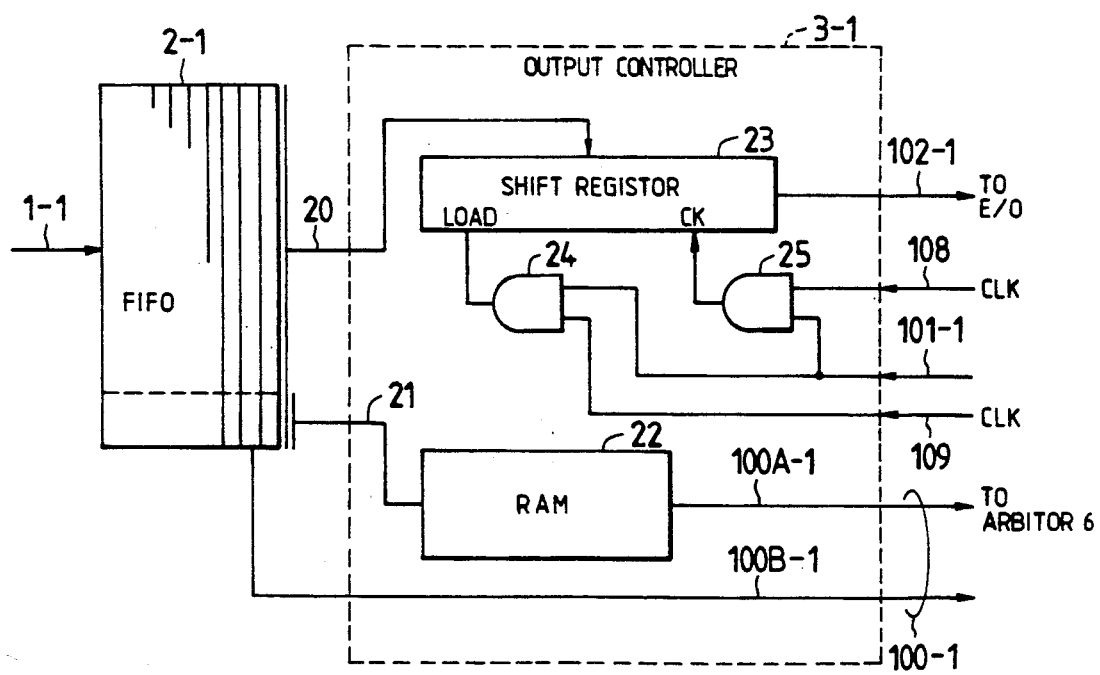
FIG. 7 shows the structure of the input buffer and output controller circuit of FIG. 1, in more detail.
Figure 8:
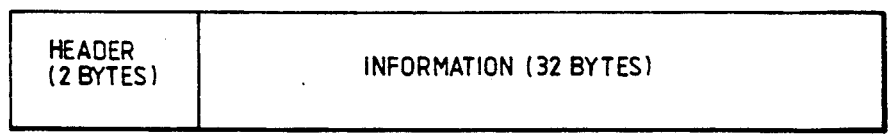
FIG. 8 illustrates the structure of a packet.
Figure 9:
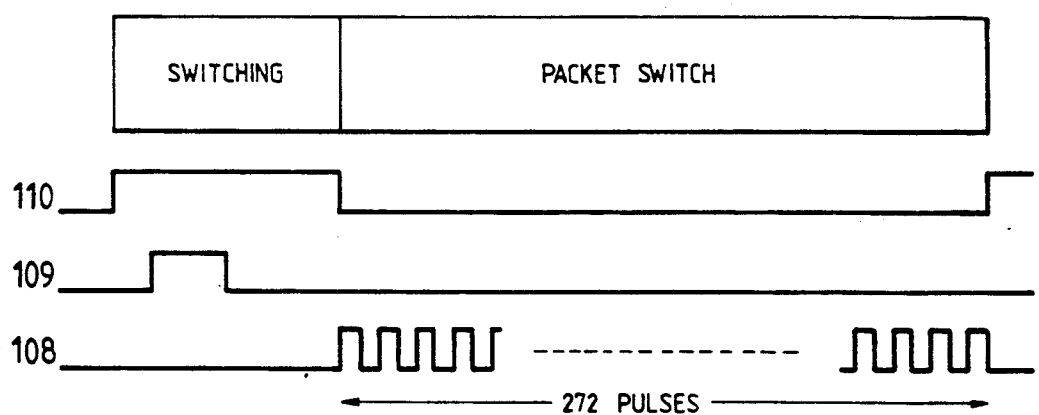
FIG. 9 is a timing diagram for the switching of the first embodiment.

FIGS. 7 through 9 show the structure and operation of the input buffer 2-1 and output control circuit 3-1, of FIG. 1, in more detail. The other input buffers 2-2 through 2-32 and output control circuits 3-2 through 3-32 are correspondingly identical and have similar operations.

FIG. 8 shows the structure of a typical packet. The packet is composed of an information portion of 32 bytes, and a header portion of 2 bytes, so that the fixed length of the packet is 34 bytes. In the present embodiment, it is assumed that a connection number (or logical channel number) is given at each set call so that each packet is interchanged with reference to the connection number in the header. The input buffers are first-in/first-out type buffers.

In the representative circuit of FIG. 7, the number of the port to be outputted can be accessed by extracting the connection number portion from the header of the packet at the head of the input buffer and table information. More specifically, the address port number of five bits, as explained previously, for the optical space division switch 5 can be stored in a table in RAM 22 at a memory location corresponding to the address of a specific connection number 21. Thus, the address from the header information of the next packet from the input buffer 2-1 is used as an address on line 21 for the RAM 22 to obtain the port number of switch 5 from the table contained in RAM 22. This port number is the five bit output port code to be contained on line 100A-1. The output request, as a sixth bit, is contained on line 100B-1. The six bits of information are sent to the arbiter 6. Of course, line 100A-1 would in fact be five separate lines to send the five bit information in parallel, with a bus 100-1 being indicated. The result of the arbitration of the arbiter 6 is returned as the signal on line 101-1 from the arbiter 6 to the output control circuit 3-1 of FIG. 7. A shift register 23 reads the packet of 34 bytes in parallel from bus 20 from the input buffer 2-1. The shift register 23 outputs this packet information of 34 bytes in series on line 102-1. In case the packets can be outputted from the input buffer 2-1, the control signal on line 101-1 is set at a high level, and clock signals 108 and 109 from clock 9 of FIG. 1 are inputted to AND gates 24 and 25. Clock 24 controls the input to the shift register 23, whereas AND gate 25 controls the output of the shift register 23. It is seen from FIG. 9, that clock signal 109 provides one pulse for the parallel input of the data to the shift register 3, whereas the clock pulses of clock signal 108 determine the serial output of the packet data from the shift register 23 along line 102-1 leading to the electrical to optical converter 4-1 shown in FIG. 1.

Figure 11:
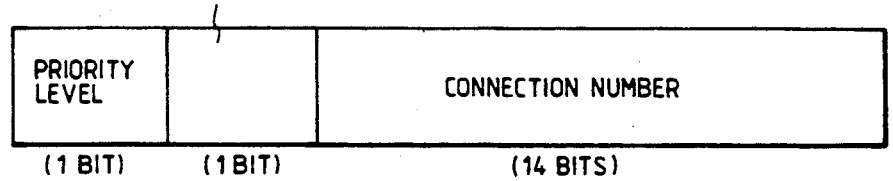
FIG. 11 illustrates bit information for the second embodiment.
Figure 10:
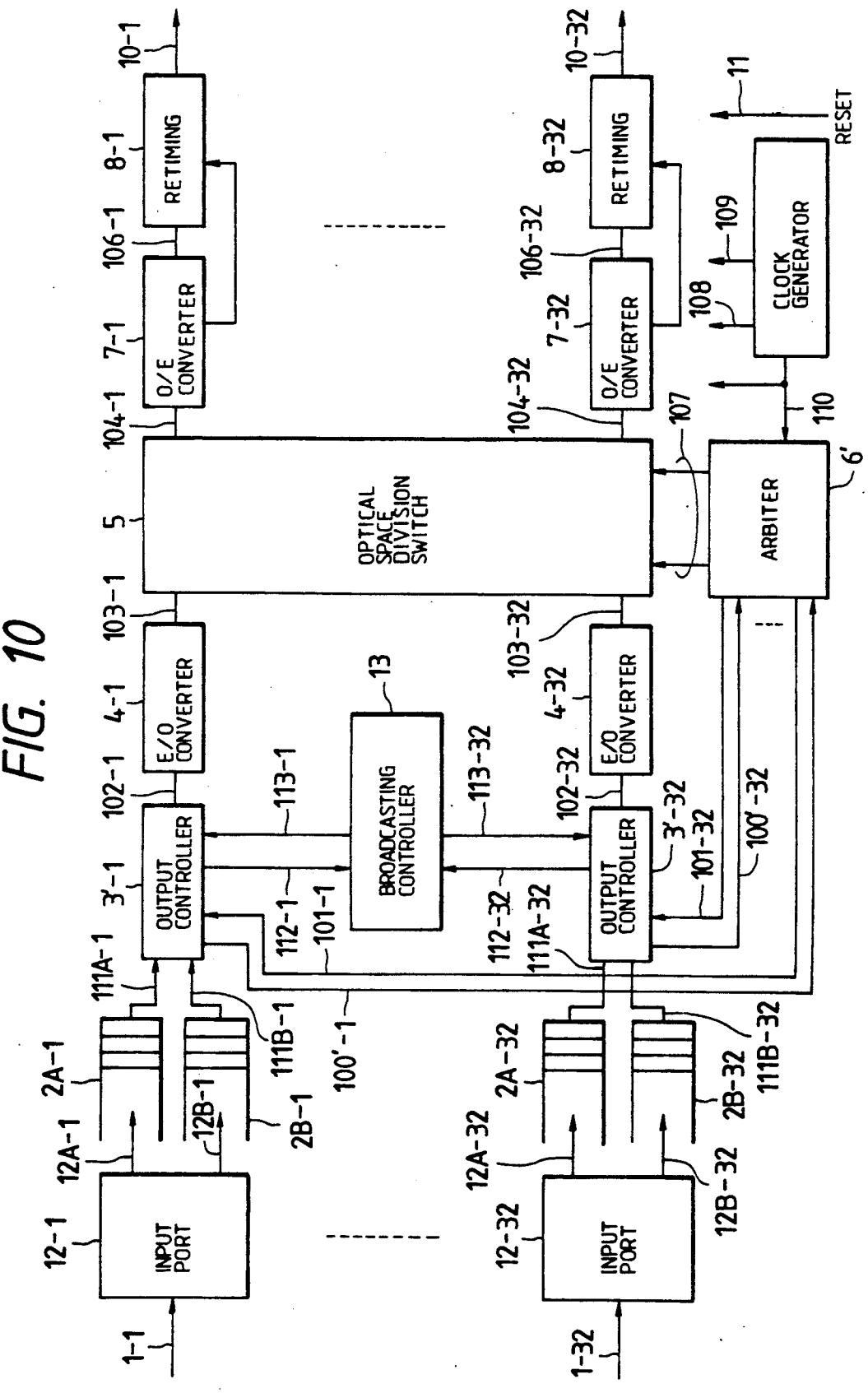
FIG. 10 shows a variation of the embodiment of the present invention.

FIG. 10 shows a further enhancement of the present invention. FIG. 1 is a broad representation of the present invention, with FIG. 10 showing the embodiment of FIG. 1 with optional additional details. FIG. 10 is exemplified by adding, to FIG. 1, a priority processing function for processing a packet having a higher priority and a broadcasting function for outputting one packet to a plurality of output ports. The packet has its header portion including one bit, a priority bit, indicating a priority level, and one bit, a broadcast bit, indicating that the packet is in the broadcasting mode; there are also fourteen bits indicating the connection number. As a result, the priority level has two kinds. This structure of the header is shown in FIG. 11. As compared to FIG. 1, each of the input buffers 2-1 through 2-32 of FIG. 1 is replaced by two input buffers 2A-1 through 2A-32 and 2B-1 through 2B-32, having respective output lines 111A-1 through 111A-32 and 111B-1 through 111B-32 leading to the output controllers, respectively, and input ports 12-1 through 12-32 having output lines 12A-1 through 12A-32 and 12B-1 through 12B-32.

Packet sharing circuits inspect the priority level bits of the headers of the packets inputted, to share the packets between the plurality of input buffers in accordance with their priority order. Here, the input buffers 2B-1 through 2B-32 have higher priority levels. Output control circuits 3'-1 through 3'-32 process the signals from input buffers 2B-1 through 2B-32 of higher priority levels before processing the signals from input buffers 2A-1 through 2A-32 of lower priority level. In case the input buffers 2B-1 through 2B-32 have no packet, the output control circuits 3-1 through 3-32 process the packets of the input buffers 2A-1 through 2A-32 having the lower priority levels.

The packets in the broadcasting mode have to be simultaneously outputted to a plurality of output ports of the optical space division switch 5. In order to process these packets for one interchange period, only one broadcasting mode packet has to be interchanged for the one interchange. That is, in the non-broadcasting mode, the optical space division switch can process a plurality of incoming packets to a plurality of output ports, but with the broadcasting mode, the optical space division switch has a lesser incoming packet capability due to a plurality of output ports being used for one packet in the broadcasting mode. With response to the broadcasting mode, packet output requests of the respective output control circuits 3-1 through 3-32 will determine which input buffer will provide packets for broadcasting. For example, the circuit of FIG. 10 can be set up so that only one input buffer provides a packet during the broadcasting mode, and the broadcasting controllers determine which one of the input buffers provides such one packet. The broadcast controller 13 receiving information on lines 112-1 through 112-32 provides output control information on lines 113-1 through 113-32 to control which one of the output controllers 3'-1 through 3'-32 is activated to pass its packet to its output in the broadcasting mode, when only one packet is delivered to the optical space division switch 5 for broadcasting. The output control circuits output the address information and priority level of the packet simultaneously to the arbiter 6', and the arbiter 6' selects a packet to be outputted, from the packets having the highest priority of all the packets addressed to the common output port. This time, the packet in the broadcasting mode is given the highest priority so that it may be outputted without fail to the output port requiring it.

Figure 12:
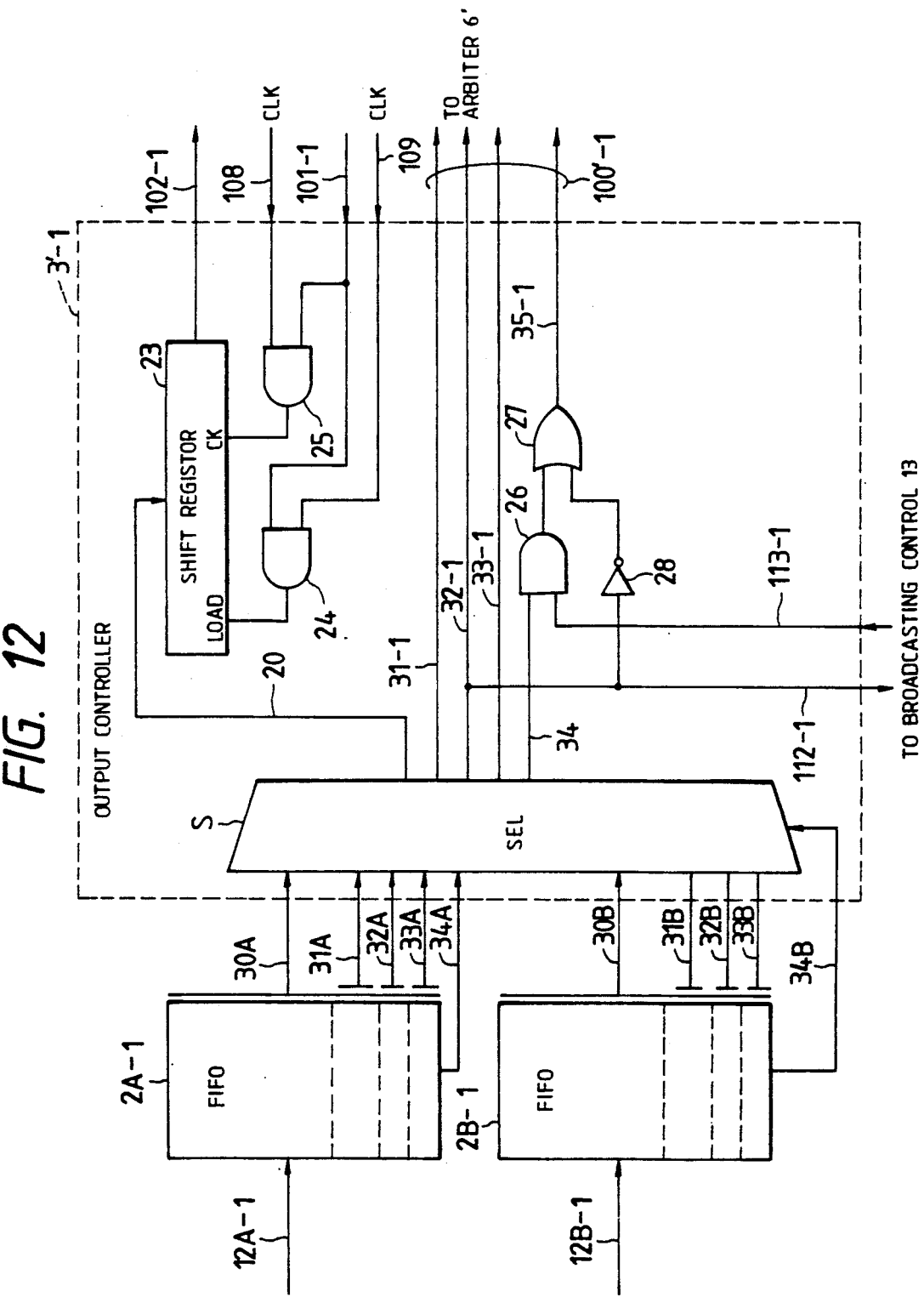
FIG. 12 illustrates the structure of the input buffers according to the second embodiment in FIG. 10, in more detail.

In FIG. 12, there is shown in more detail portions of FIG. 10, namely the input buffers and output controllers. The input buffers are first-in/first-out type of buffers.

In FIG. 12, the signal in line 30A corresponds to packet information, the signal in line 31A provides the connection number; signal in line 32A indicates the broadcast mode, signal in line 33A indicates the priority bit, while the signal in line 34A provides packet enable signal fed to the selector 29, which is part of the output controller 3-1. For the input buffer 2B-1, signals 30B through 33B correspond to previously mentioned signals 30A through 33A. Signal in line 34B is used as a select switch, to select the lower one half instead of the upper one half, according to the higher priority. That is, the packet request signal from the high priority input buffer 2B-1 is used as an enable signal for the selector S to provide the higher priority. With a signal on line 113-1 being high, indicating the broadcast mode, and a signal on line 34 being high indicating that a packet exists, the output of AND gate 26 becomes high so that the output of OR gate 27 also becomes high to provide an output request signal on line 35-1 that is high leading to the arbiter 6 to indicate the broadcast mode. Without the high broadcast signal on line 113-1, on the contrary, the output line 35-1 takes a low level so that the packet output request is not outputted to the arbitrator 6' for the broadcast mode. In the case of an output request of a packet in a mode other than the broadcasting mode from the input buffer, on the other hand, the signal on line 112-1 is low and as a result the output of the inverter 28 takes a high level so that the output 35-1 of the OR gate 27 also takes the high level, with a result that the packet output request is transmitted to the arbiter 6'. The operations of a parallel/series converting shift register 23 are similar to the previously described shift register, with respect to FIG. 7.

Figure 13:
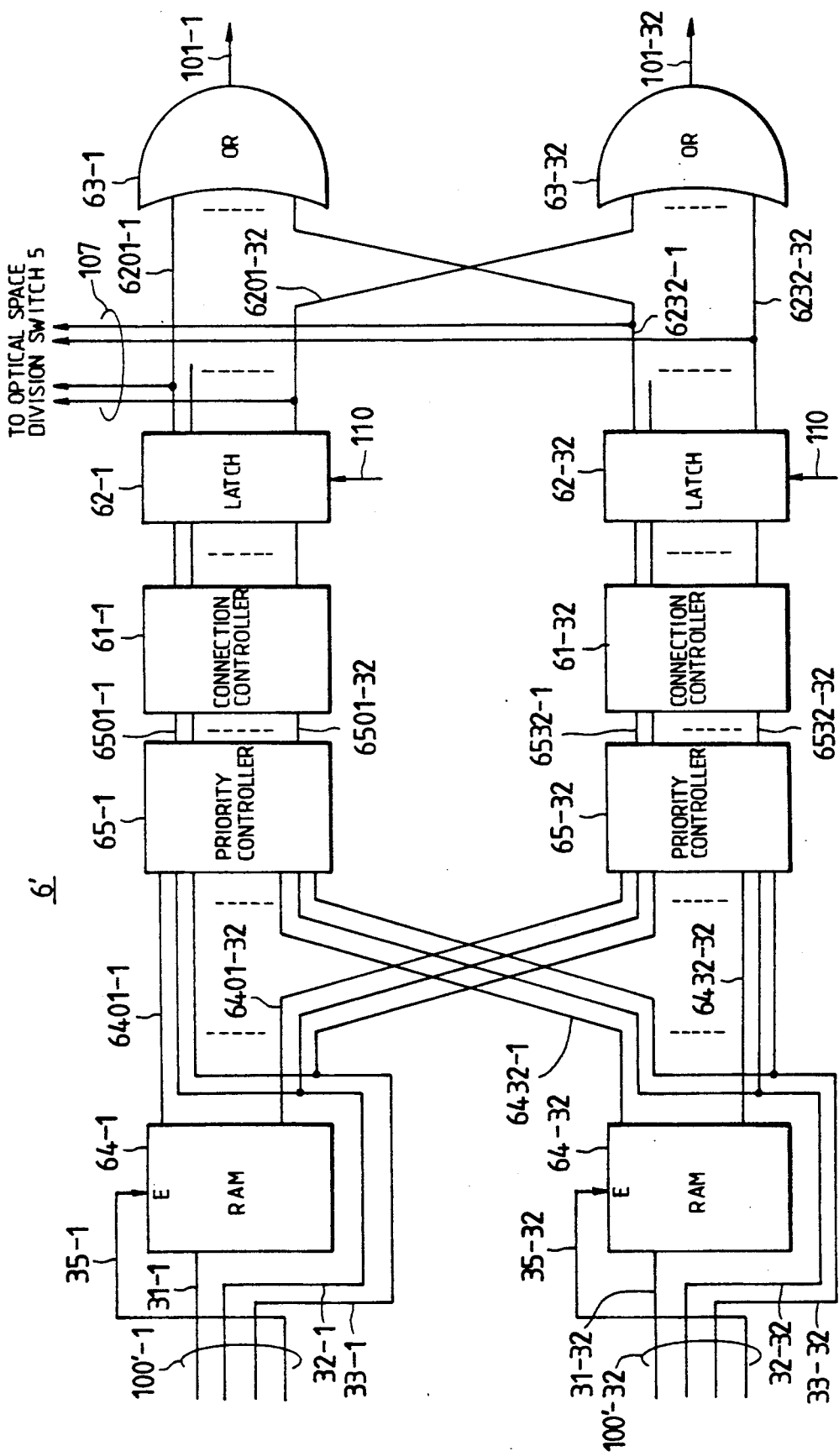
FIG. 13 illustrates the structure of the arbiter of FIG. 10, in more detail.

FIG. 13 shows the structure of the arbiter 6' of FIG. 10 in more detail. The arbiter 6' is different from the arbiter 6 of FIG. 10 in that the conversion from the packet connection number to the address output port is accomplished by the random access memory 64 located in the arbiter 6'. In the case of processing the broadcasting mode, the packets have a plurality of addresses. Therefore, the output of the random access memory for connection number to address output port conversions has to instruct, for each output port, whether or not the packet should be outputted to said port, and the output of the random access memory is required to have 32 bits, for the specific embodiment described. It is, therefore, advantageous for reducing the number of wiring lines 6401-1 through 6432-32 between the output controllers that the random access memory be disposed at the side of the arbiter. In case neither of the priority buffers of each input buffer have packets, the random access memories 64-1 through 64-32 are such that all the outputs of the random access memories take the low level. In order to process the packets of the broadcasting mode for one interchange period, they have to be processed in the highest priority by the priority control circuits. In FIG. 13, it is seen that, for example, line 35-1 contains an output request, line 31-1 contains a connection number, line 32-1 contains a broadcast request, and line 33-1 contains a priority indication. Lines 6401-1 through 6432-32 contain the packet outputting request signals fed to the priority controllers 65-1 through 65-32. In the previously described manner, the priority controllers have lines 6501-1 through 6532-32 leading to connection controllers 61-1 through 61-32. The connection controllers, latches 62-1 through 62-32, and OR gates 63-1 through 63-32 are constructed and operated as previously described.

In order to process the packets of the broadcasting mode from one interchange, they have to be processed in the highest priority by the priority controller 65-1 through 65-32. For these operations, the priority controllers are fed with the packet priorities on line 33-1 through 33-32. As shown in FIG. 11, the packets have two priority levels, which are expanded into four priority levels in the packet interchanging apparatus. In other words, the packets in the broadcasting mode have the two high priorities, and the packets in the non-broadcasting modes have the two lower priorities. That is, any packet for broadcasting takes priority over any packet for non-broadcasting, with the broadcasting packets being divided into high and low priorities, and the non-broadcasting packets being divided into high and low priorities, thus producing the mentioned four priorities.

Since the broadcasting controllers 61-1 through 61-32 perform a control to output only one packet in the broadcasting mode from the input buffers, the priority of the packets in the broadcasting mode may be only one, but two priorities are assigned for convenience of the circuit structure. In FIG. 13, in the packet interchanging apparatus shown, the two bits contained in lines 32-1 for a broadcasting request and 33-1 indicating a priority, for example with respect to the first input buffer, are used to express the priority of the packets. As a result, the broadcasting mode packets have the higher two priorities. The priority controller 65-1 through 65-32 determine the packets to be outputted to the respective output ports of the optical space division switch 5, considering the priority.

Figure 14:
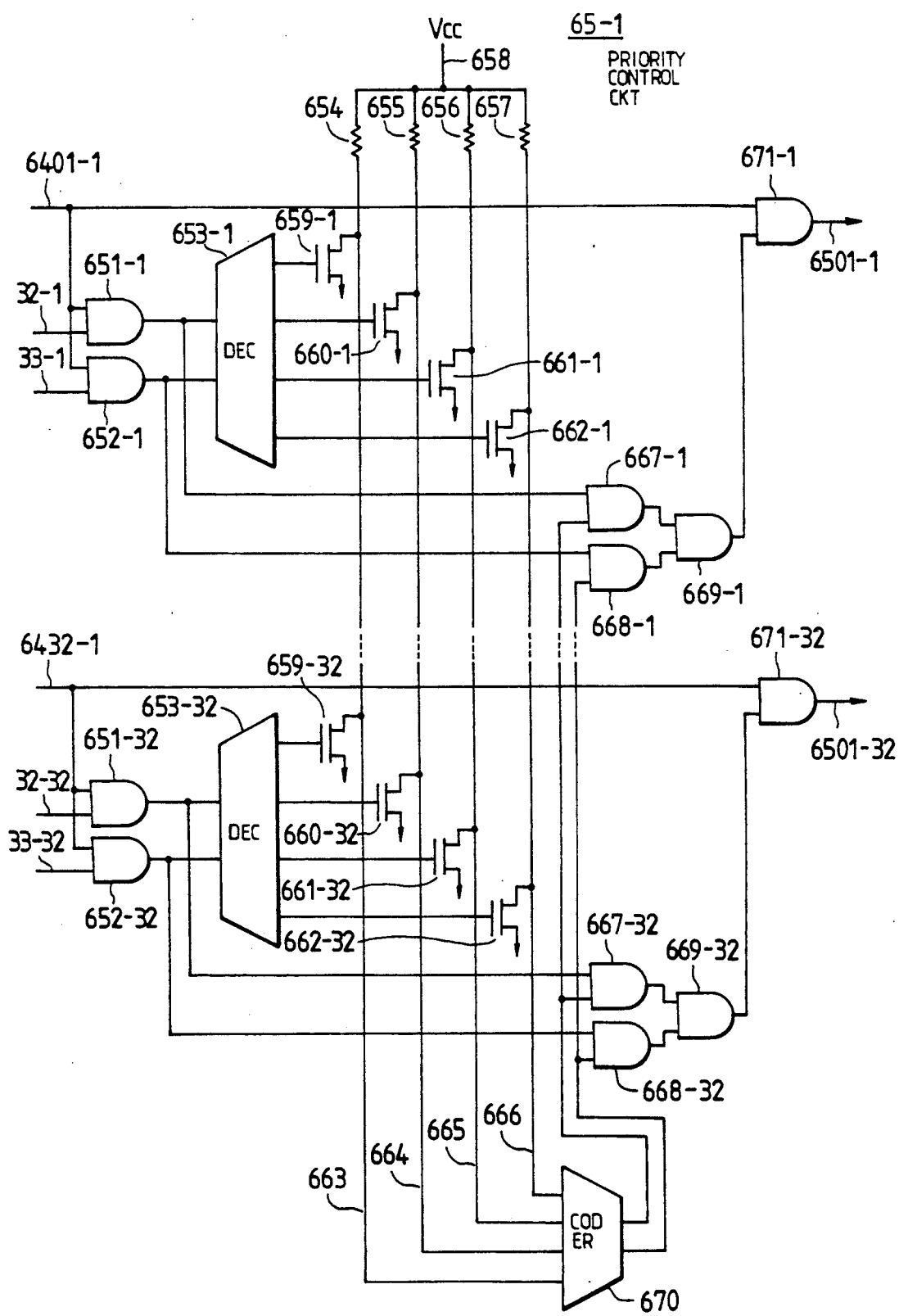
FIG. 14 illustrates in more detail the structure of the priority controller according to FIG. 10.
Figure 15:
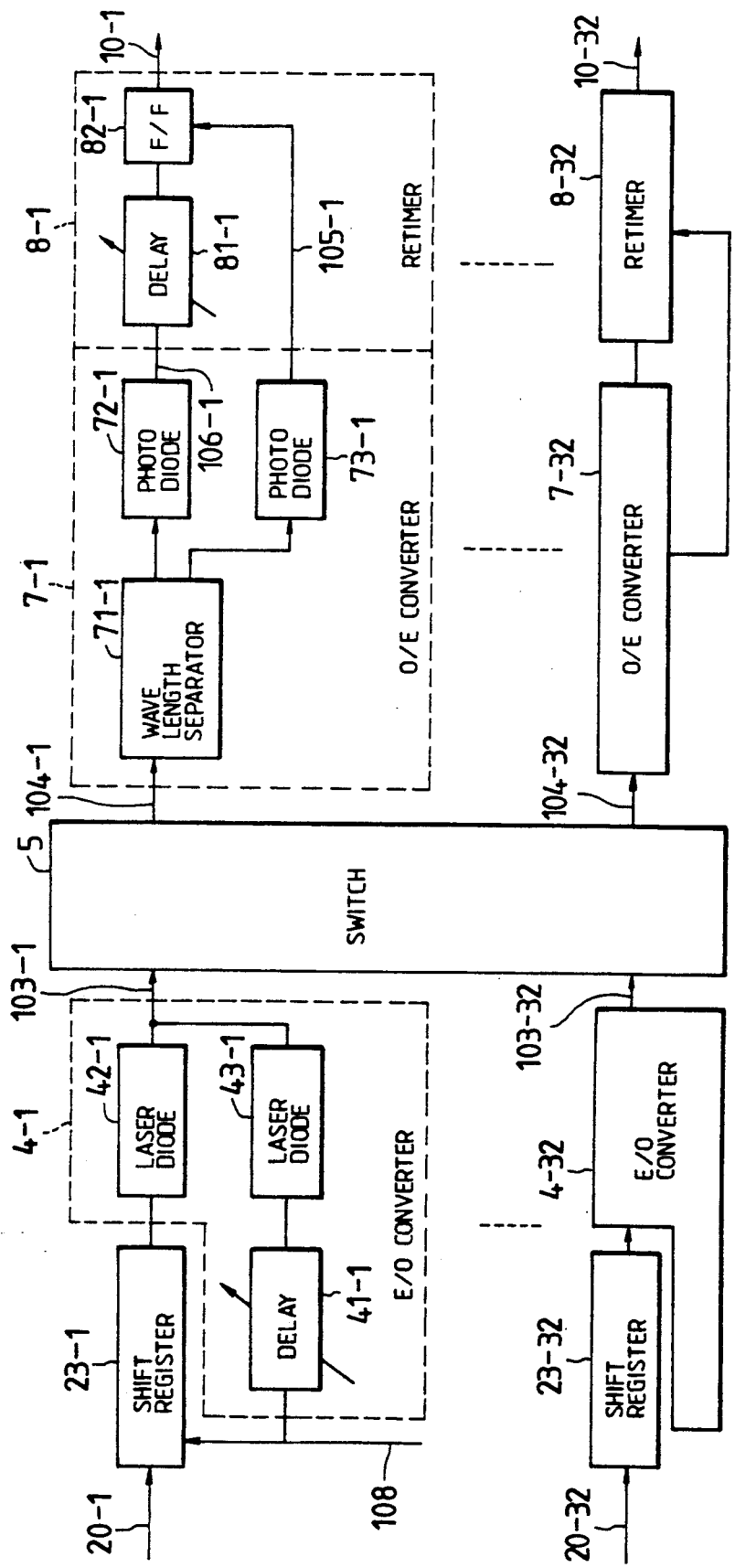
FIG. 15 shows the method of multiplexing and separating the clock and the packet date, and the method of retiming the data.

FIG. 14 shows a more detailed structure of the priority control circuit 65-1. Other priority control circuits 65-2 through 65-32 have similar structures. The packets to be outputted to the respective output ports are determined by the priority control circuits 65-1 through 65-32 and the connection control circuit 61-1 through 61-32. In FIGS. 13 and 14, reference numerals 6401-1 through 6432-1 designate packet output request signals, and numerals 32-1 through 32-32 and 33-1 through 33-32 designate priority indicating signals.

The operations will be described by taking up the signal coming from the input buffer 2-1 as an example.

In the case of no packet output request, the signal 6401-1 takes the low level. Therefore, the priority is dropped to the minimum level "00" by AND gates 651-1 and 652-1. In the presence of a high packet output request signal 6401-1, the priority level is outputted as it is to a decoder 653-1. This decoder 653-1 decodes a signal of two bits into four outputs to turn on respectively one of MOS type switches 659-1, 660-1, 661-1 and 662-1. In other words, the switch 659-1 is turned on, in case 32-1 and 33-1 are at "11", and the switch 662-1 is turned on in the case of "00". Signal lines 663, 664, 665 and 666 are connected by resistors 654, 655, 656 and 657, respectively, with a power source Vcc, 658 so that they take the low level if any of the switches connected with the individual signal lines is turned on. Therefore, the status of the signal lines 663 through 666 represent the priority of the packets to be outputted. The coder 670 converts the highest priority level of the requested packets into a signal of two bits. The coder 670 outputs the level "11", in case the highest priority level belongs to the signal line 663; the level "10" in case of the signal line 664; the level "01" in the case of the signal line 665; and the level "00" in the case of the signal line 666. The output of the coder 670 is compared with the priority level of the packet output request coming from the input port 2-1 by the AND gates 667-1, 668-1 and 669-1. Only in the case of the coincidence with the coder 670, an output is sent to AND gates 671-1 and if also line 6401-1 has an output request that is high then a request on line 6501-1 is outputted to the connection control circuit 61-1. Thus, the circuit of FIG. 14 has a function to select and output the output demand of the highest priority of the packet output request inputted. If the input port for outputting the packet is selected from the output of the priority control circuit 65-1 by the connection control circuit 61-1, it is possible to accomplish the arbitrations considering the priority.

The description thus far has not touched the priority level of the packets of the broadcasting mode. In case, however, the priority level is to be considered as to the packets of the broadcasting mode, a circuit (which has a priority level of two levels) similar to that of FIG. 14 is added to the upstream side of the broadcasting controller 13 of FIG. 10, and the priority level bit is inputted together with the broadcasting mode packet output request so that the processing can be accomplished, considering the broadcasting mode packets.

The priority levels of the broadcasting mode are clarified by the partial bits of the packet header. Despite this fact, both or either the priority level and the broadcasting mode can be extracted from the connection number. In this modification, in the packet sharing circuits 12-1 to 12-32 shown in FIG. 10, which of the priority level or the broadcasting mode the packets have can be extracted from the random access memory by using the connection numbers of the packets as the addresses. If the results are written together with the packet information in the input buffers, the subsequent processings are common to those of the second embodiment.

FIG. 15 shows the detailed multiplexing and separating method of the clock signal for one input/output of the space division optical switch 5. The output of the shift register 23 is converted into an optical signal by a laser diode 42-1. On the other hand, a clock signal 108 is fed to shift register 23 with a suitable delay by a variable delay circuit 41-1 and converted by a laser diode 43-1 into an optical signal. This optical signal is waveform-multiplexed over the output of the laser diode 42-1 until it is inputted to the space division optical switch 5. The laser diodes 42-1 and 43-1 output optical signals of different wave lenghts. At the output side of the space division optical switch, the wave form is separated by a wave length separating circuit 71-1, and the packet data and the clock are converted into electrical signals by avalanche photodiodes 72-1 and 73-1 and electronic amplifier if required. The packet data are suitably delayed by variable delay circuit 81-1 and retimed by a flip-flop 82-1. If a variable delay circuit 41-1 at the input side and the variable delay circuit 81-1 at the output side are so adjusted that the packet data and the clock may have an equal delay, the packet data can be retimed with the optimum timing with the connection of the space division optical switch to change the delay between the input and output of the switch. On the other hand, a flip-flop output 10-1 has to be synchronized with a clock of the output side, but this synchronization can be effected by a known circuit, the description of which is omitted here.

Moreover, the packet data can be transmitted by the wave length multiplexing technique. If, for example, the packet data of eight bits are arranged in parallel and transmitted with eight different waves, the operation speed of the optical elements and the logical elements can be dropped to $\frac{1}{8}$.

According to the present invention, the optical elements can be used as wires and switches so that the transmission capacity for one line can be increased to easily enlarge the capacity of the packet interchanging apparatus. The interchanging operations are controlled by the concentrated controllers. It is easy to process the packets given the priority and the packets of the broadcasting mode.

Although a space division switch has been known per se, it has not been used for high speed packet switching prior to the present invention. For an example of an optical switch used in time division multiplexing, reference is made to U.S. Pat. No. 4,397,016, issued Aug. 2, 1983, whose disclosure is incorporated herein.

When not in the broadcasting mode, many connections may be made in the same time period, with the speed of the connections being great as compared to previous packet switching. That is, the optical space division switch, used in packet switching, is many times greater in speed than corresponding electrical switching, and has an enlarged capacity. With the use of fixed length packets and headers, a plurality of connections may be made at one time, because the time for passage through the optical space division switch for the various packets will be within a small range, which is advantageous for enlarged capacity.

The speed of processing can be increased by pulling out the connection numbers and other header information that is in a position prior to next out from the input buffer, that is before the packet is at the head of the buffer, so that decisions such as broadcasting, priority, arbitration and switch connections can all be made as far in advance as desired, to increase processing speed. The speed of the entire switching apparatus, of the present invention, is about 9.6 Gbps, from port to port.

It takes about 28 nanoseconds for an entire packet to transmit, there may be a delay time of 5 to 6 ns per meter, so that there may be a phase difference. A transmit clock signal can control the output and a filter in circuit 8-1 of FIG. 15 may provide reshaping.

While a preferred embodiment has been set forth along with modifications and variations to show specific advantageous details of the present invention, further embodiments, modifications and variations are contemplated within the broader aspects of the present invention, all as set forth by the spirit and scope of the following claims.

I claim:

1. A packet switching apparatus for fixed length packets, comprising:
   a plurality of input buffer means for a corresponding plurality of input ports, each of said input buffer means storing a plurality of packets as they arrive at a respective input port;
   space division type switch means for transferring packet information from a corresponding plurality of switch inputs to a plurality of switch outputs, with said switch outputs corresponding in number to a plurality of output ports;
   transfer means operatively connecting said input buffer means respectively to said switch inputs;
   control means responsive to header information in the packets for selecting all packets requesting transmission to different output ports and for controlling said space division switch means to set up a plurality of paths between switch inputs and switch outputs in response to header information in the selected ones of the packets; and
   said control means including only a single control arbiter means common to all said input buffer means and transfer means to be responsive to packet header information, for detecting the presence of packets addressed to a common one of the output ports and controlling said transfer means for transmitting only one of the packets addressed to the same output port to said space division switch means.

2. The apparatus according to claim 1, including said transfer means synchronously transmitting a plurality of packets from said input buffer means to the switch inputs during time divisions alternating with the internal setting of switch connections within said space division switch means.

3. The apparatus according to claim 2, wherein said switch means is optical switch means for transferring optical packet information.

4. The apparatus according to claim 2, wherein said control means is further responsive to header information in the packets for controlling said space division switch means to set up a plurality of broadcast paths between one switch input and a corresponding plurality of switch outputs.

5. The apparatus of claim 4, wherein said control means includes a plurality of address decoders, each connected respectively to one of said input buffer means for decoding the header information in the packets.

6. The apparatus according to claim 2, said control means further including arbiter means, responsive to packet header information, for detecting the presence of packets addressed to a common one of output ports, and controlling said transfer means for transmitting only one of the packets addressed to the same output port to said space division switch means.

7. The apparatus according to claim 6, wherein said switch means is optical switch means for transferring optical packet information.

8. The apparatus according to claim 6, wherein said control means is further responsive to header information in the packets for controlling said space division switch means to set up a plurality of broadcast paths between one switch input and a corresponding plurality of switch outputs.

9. The apparatus of claim 8, wherein said control means includes a plurality of address decoders, each connected respectively to one of said input buffer means for decoding the header information in the packets.

10. The apparatus of claim 6, wherein said arbiter means operates at parallel with said control means for setting the switch connections so that said arbiter means is determining priority of packets in said input buffer means that arrived subsequently to the packets at the head of said input buffer means to be transmitted next.

11. The apparatus according to claim 10, wherein said switch means is optical switch means for transferring optical packet information.

12. The apparatus according to claim 10, wherein said control means is further responsive to header information in the packets for controlling said space division switch means to set up a plurality of broadcast paths between one switch input and a corresponding plurality of switch outputs.

13. The apparatus of claim 12, wherein said control means includes a plurality of address decoders, each connected respectively to one of said input buffer means for decoding the header information in the packets.

14. The apparatus of claim 1, further including means for multiplexing a clock signal and a plurality of packets to provide a multiplexed signal, and transmitting said multiplexed signal through one path in the space division switch.

15. The apparatus according to claim 14, wherein said switch means is optical switch means for transferring optical packet information.

16. The apparatus according to claim 14, wherein said control means is further responsive to header information in the packets for controlling said space division switch means to set up a plurality of broadcast paths between one switch input and a corresponding plurality of switch outputs.

17. The apparatus of claim 14, wherein said means for multiplexing simultaneously multiplexes a plurality of bits corresponding respectively to different packets and a single clock signal.

18. The apparatus according to claim 17, wherein said switch means is optical switch means for transferring optical packet information.

19. The apparatus according to claim 17, wherein said control means is further responsive to header information in the packets for controlling said space division switch means to set up a plurality of broadcast paths between one switch input and a corresponding plurality of switch outputs.

20. The apparatus according to claim 17, including multiplexing means downstream of said space division switch for separating the multiplexed packet signals, and retimer means responsive to said clock signal for reshaping the separated packet signals.

21. The apparatus according to claim 20, wherein said switch means is optical switch means for transferring optical packet information.

22. The apparatus according to claim 20, wherein said control means is further responsive to header information in the packets for controlling said space division switch means to set up a plurality of broadcast paths between one switch input and a corresponding plurality of switch outputs.

23. The apparatus of claim 14, wherein said means for multiplexing forms wavelength multiplexing.

24. The apparatus of claim 23, wherein said means for multiplexing simultaneously multiplexes a plurality of bits corresponding respectively to different packets and a single clock signal.

25. The apparatus of claim 24, including multiplexing means downstream of said space division switch for separating the multiplexed packet signals, and filter means responsive to said clock signal for reshaping the separated packet signals.

26. The apparatus according to claim 1, wherein said switch means is optical switch means for transferring optical packet information.

27. The apparatus according to claim 1, wherein said control means is further responsive to header information in the packets for controlling said space division switch means to set up a plurality of broadcast paths between one switch input and a corresponding plurality of switch outputs.

28. The apparatus according to claim 27, further including means for establishing priority between header information in at least one packet requesting broadcasting and the header information of packets setting up a plurality of paths.

29. The apparatus of claim 27, wherein said control means includes a plurality of address decoders, each connected respectively to one of said input buffer means for decoding the header information in the packets.

30. The apparatus of claim 1, wherein said control means includes a plurality of address decoders, each connected respectively to one of said input buffer means for decoding the header information in the packets.

31. The apparatus of claim 1, including a separate priority controller operatively connected between each of said input buffer means and a respective transfer means.

32. A packet switching apparatus, comprising:
a plurality of input ports;
a plurality of output ports;
a plurality of input buffer means, respectively connected for receiving fixed length packets from said plurality of input ports and each storing a plurality of fixed length packets on a first-in/first-out basis;
a plurality of output controllers, respectively receiving packets from said input buffers, and having outputs;
cross point type optical space division switch means having a plurality of switch inputs respectively connected to the outputs of said output controllers and a plurality of switch outputs corresponding in number to said plurality of output ports, and for selectively providing optical connection between any one of said switch inputs and said switch outputs;
arbiter means responsive to header information of all of the packets at a corresponding location in each of said input buffer means for determining priority of packets addressed to a common one of the output ports and for controlling said optical space division switch means for setting up a plurality of optical paths between a plurality of switch inputs and a corresponding plurality of switch outputs.

33. The apparatus according to claim 32, wherein said arbiter means controls output of selected ones of packets at the head of said input buffer means for transmission to said optical space division switch means and controls connection of optical paths between the switch inputs and switch outputs of said optical space division switch means in accordance with the header information of the selected ones of said packets, while simultaneously arbitrating header information from the packets following said selected packets, to provide for parallel arbitration and switch connection processing.

34. The apparatus according to claim 33, wherein said input buffer means holds said packets as electrical data; and further including electrical to optical converter means respectively between each of said input buffer means and the switch inputs of said optical space division switch means.

35. The apparatus according to claim 32, wherein said input buffer means holds said packets as electrical data; and further including electrical to optical converter means respectively between each of said input buffer means and the switch inputs of said optical space division switch means.

36. The apparatus according to claim 32, wherein said control means is further responsive to header information in the packets for controlling said space division switch means to set up a plurality of broadcast paths between one switch input and a corresponding plurality of switch outputs.

37. The apparatus of claim 36, wherein said control means includes a plurality of address decoders, each connected respectively to one of said input buffer means for decoding the header information in the packets.

38. A packet switching method, comprising the steps of:
providing a plurality of fixed length packets at a plurality of input ports;
storing a plurality of packets, as they arrive, at each of the plurality of input ports;
decoding the address of at least one packet from each of the input ports and producing an output request signal for each packet corresponding to one of a plurality of output ports;
selecting one of a plurality of packets simultaneously requesting transmission to the same output port and selecting all packets requesting transmission to different output ports;
setting a plurality of optical paths between switch inputs and switch outputs of an optical space division switch in accordance with the header address information in the selected ones of the packets; and
converting the selected packets from electrical form to optical form and transmitting them through the set optical paths simultaneously.

39. A packet switching method as set forth in claim 38, including storing input port numbers from which individual outputs ports have received packets, and arbitrating which one of a plurality of packets having the same output port request is to be sent so that the next packet may be delivered from an input port different from the previous one.

40. A packet switching method for fixed-length packets in an apparatus comprising input buffers for temporarily storing packets arriving at input ports and switches for transferring packets from input buffers to designated output ports comprising:

controlling the switches by using the header information of the packets in the input buffers, by decoding the address of the packet of each input buffer i (i=1 to N:N= the number of input ports) to produce a packet output request signal A (i, j) for a packet transfer to each output port j (j=1 to M:M= the number of said output ports);

determining the packets to be sent to individual output ports based on the request signals A (i, j) (i=1 to N) collected for said output ports and outputting a packet output enable signal B (i, j) for allowing the packet to be sent from input port i to output port j; and taking a logical sum at each input port of output enable signals B (i, j), (j=1 to M) to decide whether or not the packet output from input buffer i should be made.

41. A packet switching apparatus for fixed length packets, comprising:

a plurality of input buffer means for a corresponding plurality of input ports, each of said input buffer means storing a plurality of packets as they arrive at a respective input port;

space division type switch means for transferring packet information from a corresponding plurality of switch inputs to a plurality of switch outputs, with said switch outputs corresponding in number to a plurality of output ports;

transfer means operatively connecting said input buffer means respectively to said switch inputs;

control means responsive to header information in the packets for controlling said space division switch means to set up a plurality of paths between switch inputs and switch outputs in response to header information for sending at least a packet from one of said input buffers through said space division type switch means during a fixed period of time; and said control means, during said fixed period of time, processing header information from the packet following the first packet in said one of said input buffer means to determine signals for setting said space division type switch means for the following packet.

42. The apparatus of claim 41, wherein said control means selects all packets requesting transmission to different output ports for controlling said space division switch means to set up a plurality of paths between switch inputs and switch outputs in packets.

43. The apparatus of claim 42, wherein said switch means is optical switch means for transferring optical packet information.

44. The apparatus of claim 41, wherein said switch means is optical switch means for transferring optical packet information.

45. A packet switching apparatus for fixed length packets, comprising:

a plurality of input buffer means for a corresponding plurality of input ports, each of said input buffer means storing a plurality of packets as they arrive at a respective input port;

space division type switch means for transferring packet information from a corresponding plurality of switch inputs to a plurality of switch outputs, with said switch outputs corresponding in number to a plurality of output ports;

transfer means operatively connecting said input buffer means respectively to said switch inputs;

control means responsive to header information in the packets for controlling said space division switch means to set up paths between switch inputs and switch outputs in response to header information;

means for multiplexing a clock signal and a packet to provide a multiplexed signal, and transmitting the multiplexed signal through the set path in the space division switch means; and multiplexing means downstream of said space division switch means for separating the multiplexed signal into a packet signal and a clock signal, and being responsive to the separated clock signal for reshaping the separated packet signal.

46. The apparatus of claim 45, wherein said switch means is optical switch means for transferring optical packet information.

47. The apparatus of claim 46, wherein said means for multiplexing wavelength multiplexes the packet and clock.

48. The apparatus of claim 45, wherein said means for multiplexing wavelength multiplexes the packet and clock.

49. A packet switching apparatus for fixed length packets, comprising:

a plurality of input buffer means for a corresponding plurality of input ports, each of said input buffer means storing a plurality of packets as they arrive at a respective input port;

space division type switch means for transferring packet information from a corresponding plurality of switch inputs to a plurality of switch outputs, with said switch outputs corresponding in number to a plurality of output ports;

transfer means operatively connecting said input buffer means respectively to said switch inputs; and control means responsive to header information in the packets for selecting a packet requesting broadcast transmission to different output ports and for controlling said space division switch means to set up a plurality of broadcast paths between only one switch input and a plurality of switch outputs in response to broadcast header information in the selected packets.

50. The apparatus of claim 49, wherein said control means includes a plurality of address decoders, each connected respectively to one of said input buffer means for decoding the header information in the packets.

51. The apparatus of claim 49, including a separate priority controller operatively connected between each of said input buffer means and a respective transfer means.

52. The apparatus of claim 51, wherein said control means includes a plurality of address decoders, each connected respectively to one of said input buffer means for decoding the header information in the packets.

53. The apparatus of claim 52, wherein said switch means is optical switch means for transferring optical packet information.

54. The apparatus of claim 49, wherein said switch means is optical switch means for transferring optical packet information.

55. A packet switching apparatus for fixed length packets, comprising:
- a plurality of input buffer means for a corresponding plurality of input ports, each of said input buffer means storing a plurality of packets as they arrive at a respective input port;
- space division type switch means for transferring packet information from a corresponding plurality of switch inputs to a plurality of switch outputs, with said switch outputs corresponding in number to a plurality of output ports;
- transfer means operatively connecting said input buffer means respectively to said switch inputs; and
- control means responsive to header information in the packets for selecting all packets requesting transmission to different output ports and for controlling said space division switch means to set up a plurality of paths between switch inputs and switch outputs in response to header information in the selected ones of the packets.

* * * * *